United States Patent
Lynar et al.

(10) Patent No.: US 10,915,601 B2
(45) Date of Patent: Feb. 9, 2021

(54) PERSONALIZED PARTICULATE MATTER EXPOSURE MANAGEMENT USING FINE-GRAINED WEATHER MODELING AND OPTIMAL CONTROL THEORY

(71) Applicant: INTERNATIONAL BUSINESS MACHINES CORPORATION, Armonk, NY (US)

(72) Inventors: Timothy M. Lynar, Kew (AU); Stephen M. Moore, Melbourne (AU); Melanie E. Roberts, North Melbourne (AU); John M. Wagner, Plainville, CT (US); Sergiy Zhuk, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1005 days.

(21) Appl. No.: 15/199,685

(22) Filed: Jun. 30, 2016

(65) Prior Publication Data
US 2018/0004866 A1  Jan. 4, 2018

(51) Int. Cl.
G06F 17/10 (2006.01)
G06F 17/18 (2006.01)
G01W 1/10 (2006.01)

(52) U.S. Cl.
CPC ............. *G06F 17/18* (2013.01); *G01W 1/10* (2013.01)

(58) Field of Classification Search
CPC .. G01F 1/74; G01F 25/00; H04W 4/00; H02J 3/14; G06F 17/30; G06F 17/50; G01N 33/00; G01N 212/35; G08G 1/00; G01W 1/10; G06N 5/04; G06N 5/042; B01D 46/44
See application file for complete search history.

(56) References Cited

U.S. PATENT DOCUMENTS

| | | | |
|---|---|---|---|
| 8,903,646 B2 * | 12/2014 | Althen | G06Q 99/00 701/117 |
| 9,304,348 B2 | 4/2016 | Jang | |
| 9,719,972 B2 * | 8/2017 | Cogill | G01N 33/0004 |
| 9,759,597 B2 * | 9/2017 | Wong | G01P 21/02 |

(Continued)

OTHER PUBLICATIONS

Akhtar Use of Inverse Modeling in Air Quality Management School of Earth and Atmospheric Sciences, Georgia Institute of Technology, Dec. 2009 (Year: 2009).*

(Continued)

*Primary Examiner* — Rehana Perveen
*Assistant Examiner* — Cuong V Luu
(74) *Attorney, Agent, or Firm* — Tutunjian & Bitetto, P.C.; Joseph Petrokaitis

(57) ABSTRACT

A method and system are provided. The method includes performing, by at least a computer processing system having a hardware processor, a particulate mapping process to predict particulate exposure at a target location based on an estimated particulate source, an estimated particulate source output, and a fine-grained weather forecast for the target location. The performing step includes estimating the target location using a fine-grained weather hindcast and inverse modelling. The performing step further includes generating observations of particulate exposure for one or more specific particulates, using a set of particulate sensors.

20 Claims, 7 Drawing Sheets

(56) References Cited

U.S. PATENT DOCUMENTS

| | | | |
|---|---|---|---|
| 9,884,281 B2* | 2/2018 | Fox | B64D 13/06 |
| 2011/0122397 A1* | 5/2011 | Wong | G01S 15/885 |
| | | | 356/51 |
| 2014/0142456 A1* | 5/2014 | Fischer | A61B 5/0871 |
| | | | 600/538 |
| 2014/0324351 A1* | 10/2014 | Dannevik | G01W 1/10 |
| | | | 702/3 |
| 2015/0153317 A1* | 6/2015 | Krebs | G01N 33/0062 |
| | | | 96/397 |
| 2015/0379400 A1* | 12/2015 | Tatourian | H04L 67/22 |
| | | | 706/46 |
| 2016/0091474 A1* | 3/2016 | Griffon | G01N 33/0036 |
| | | | 702/24 |
| 2016/0117372 A1* | 4/2016 | Krafft | G06F 16/26 |
| | | | 715/739 |
| 2016/0256097 A1* | 9/2016 | Manautou | A61B 5/411 |
| 2016/0290979 A1* | 10/2016 | Cogill | G01N 33/0004 |
| 2016/0318368 A1* | 11/2016 | Alger | B60H 1/00771 |
| 2016/0359325 A1* | 12/2016 | Kawata | G16H 40/67 |
| 2017/0091350 A1* | 3/2017 | Bauer | G06F 17/5095 |
| 2017/0124461 A1* | 5/2017 | Li | G01W 1/00 |
| 2017/0127220 A1* | 5/2017 | Rosti | G06F 17/5009 |
| 2017/0225537 A1* | 8/2017 | Kulthe | B60H 1/008 |
| 2017/0316328 A1* | 11/2017 | Dong | G06Q 99/00 |

OTHER PUBLICATIONS

Ram et al. Localization and Intensity Tracking of Diffusing Point Sources Using Sensor Networks IEEE 2007 (Year: 2007).*

Mahmoud Bady Fundamentals of Direct Inverse CFD Modeling to Detect Air Pollution Sources in Urban Areas Computational Water, Energy, and Environment Engineering, 2013, 2, pp. 31-42 (Year: 2013).*

Zhang et al. Real-Time Air Quality Forecasting, Part I: History, Techniques, and Current Status Atmospheric Environment, 60 (2012) pp. 632-655 (Year: 2012).*

Zhang et al. Inversely Tracking Indoor Particles to Locate Their Release Sources Atmospheric Environment 55, 2012 pp. 328-338 (Year: 2012).*

Vujadinovic, et al., "Locating a Source of Air Pollution Using Inverse Modelling and Pre-computed Scenarios", International Congress on Environmental Modelling and Software Integrating Sciences and Information Technology for Environmental Assessment and Decision Making 4th Biennial Meeting of iEMSs, Jul. 2008, pp. 129-133.

Henze, et al., "Inverse modeling and mapping US air quality influences of inorganic PM2.5 precursor emissions using the adjoint of GEOS-Chem", Atmospheric Chemistry and Physics, Aug. 2009, pp. 877-5903.

Parra-Guevara, et al., "On Optimal Solution of an Inverse Air Pollution Problem: Theory and Numerical Approach", Elsevier, Mathematical and Computer Modelling, Mar. 2005, pp. 766-778.

Sundhar Ram, et al., "Localization and Intensity Tracking of Diffusing Point Sources Using Sensor Networks", IEEE Communications Society, IEEE GLOBECOM Proceedings, Dec. 2007, pp. 3107-3111.

* cited by examiner

PERSONALIZED PARTICULATE MATTER EXPOSURE MANAGEMENT USING FINE-GRAINED WEATHER MODELING AND OPTIMAL CONTROL THEORY

BACKGROUND

Technical Field

The present invention relates generally to information processing and, in particular, to personalized particulate matter exposure management using fine-grained weather modeling and optimal control theory.

Description of the Related Art

Suspended fine particulate matter such as, for example, pollens, are released into the air at discrete locations and transported by winds. High concentrations of pollens and other fine particulate matter affect the health of many people. For example, hay fever sufferers can experience symptoms such as irritated eyes, sneezing and nose bleeds due to the presence of pollen and often require medication. As another example, asthma sufferers can experience life threatening attacks requiring urgent medical treatment. An individual's conditions and degree of reaction can be treated in a variety of ways, with some sufferers using medications prophylactically when they expect to encounter triggers. An alternative approach to reducing the impact of fine particulate matters is to reduce exposure to triggers. This can be achieved by suppressing the release of fine particulates into the environment, or by avoiding areas with high concentrations of particulates. However, regarding the latter, there currently is no solution that is optimized for an individual regarding avoiding areas with high concentrations of particulates. Thus, there is a need for an improved way to avoid areas with high concentrations of particulates.

SUMMARY

According to an aspect of the present principles, a method is provided. The method includes performing, by at least a computer processing system having a hardware processor, a particulate mapping process to predict particulate exposure at a target location based on an estimated particulate source, an estimated particulate source output, and a fine-grained weather forecast for the target location. The performing step includes estimating the target location using a fine-grained weather hindcast and inverse modelling. The performing step further includes generating observations of particulate exposure for one or more specific particulates, using a set of particulate sensors.

According to another aspect of the present principles, a computer program product is provided for particulate matter exposure management. The computer program product includes a non-transitory computer readable storage medium having program instructions embodied therewith. The program instructions are executable by a computer to cause the computer to perform a method. The method includes performing, by at least a computer processing system having a hardware processor, a particulate mapping process to predict particulate exposure at a target location based on an estimated particulate source, an estimated particulate source output, and a fine-grained weather forecast for the target location. The performing step includes estimating the target location using a fine-grained weather hindcast and inverse modelling. The performing step further includes generating observations of particulate exposure for one or more specific particulates, using a set of particulate sensors.

According to yet another aspect of the present principles, a system is provided. The system includes a set of particulate sensors. The system further includes a computer processing system having a hardware processor, configured to perform a particulate mapping process to predict particulate exposure at a target location based on an estimated particulate source, an estimated particulate source output, and a fine-grained weather forecast for the target location. The mapping process is performed by estimating the target location using a fine-grained weather hindcast and inverse modelling, and generating observations of particulate exposure for one or more specific particulates, using the set of particulate sensors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to personalized particulate matter exposure management using fine-grained weather modeling and optimal control theory. Such management can include, but is not limited to, predicting particulate matter exposure. In this way, a user can manage his or her exposure. Moreover, such management can include outputting/providing to a user data (e.g., maps, etc.) and strategies for avoiding the particulate matter exposure.

In an embodiment, a particulate mapping process (hereinafter interchangeably referred to as "mapping process" in short) is performed. The mapping process can involve determining the location of a source of particulate matter using a fine-grained weather hindcast and inverse modelling. Moreover, the mapping process can involve obtaining observations (e.g., pollen count, etc.) for specific particulates, using a set (e.g., a network, an array, etc.) of sensors. Further, the mapping process can involve predicting/estimating (hereinafter "predicting" or variations thereof) particulate exposure at a target location based on an estimated particulate source, an estimated particulate source output, and a fine-grained weather forecast for the target location.

In an embodiment, the mapping can involve predicting exposure at a target location over time. In an embodiment, the exposure is predicted over time for a moving source. In an embodiment, the exposure is predicted over time for a moving source as determined by a known model. In an embodiment, computations relating to the exposure involving the known model are performed by a cloud service.

In an embodiment, the mapping can be performed such that optimal routes are calculated for avoiding or for encountering no more than a certain amount (e.g., a threshold amount) of particulate matter.

In an embodiment, a set of optimal particulate matter suppression strategies can be calculated for a user based on predicted/forecasted background conditions.

Figure 1:
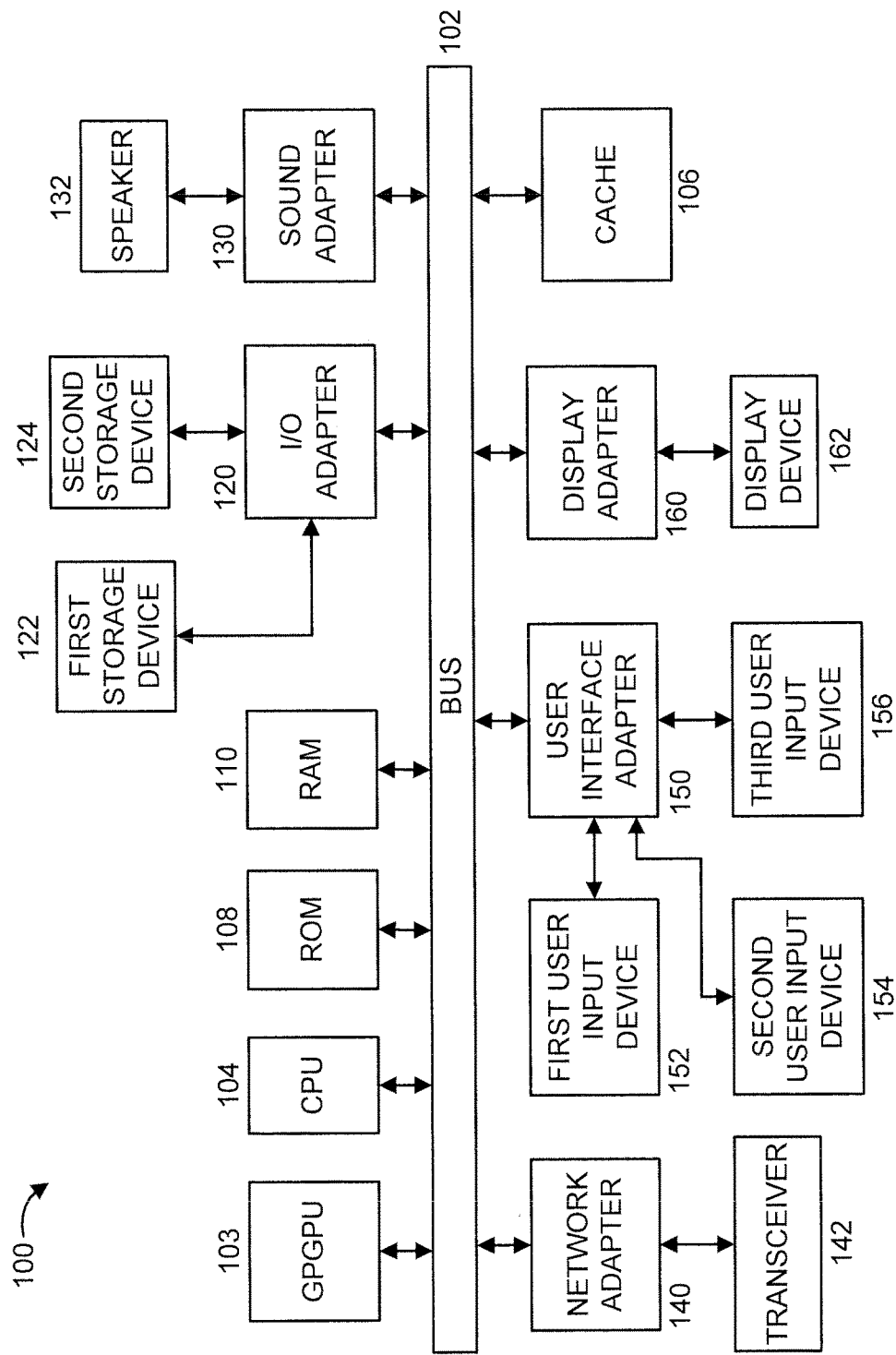
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
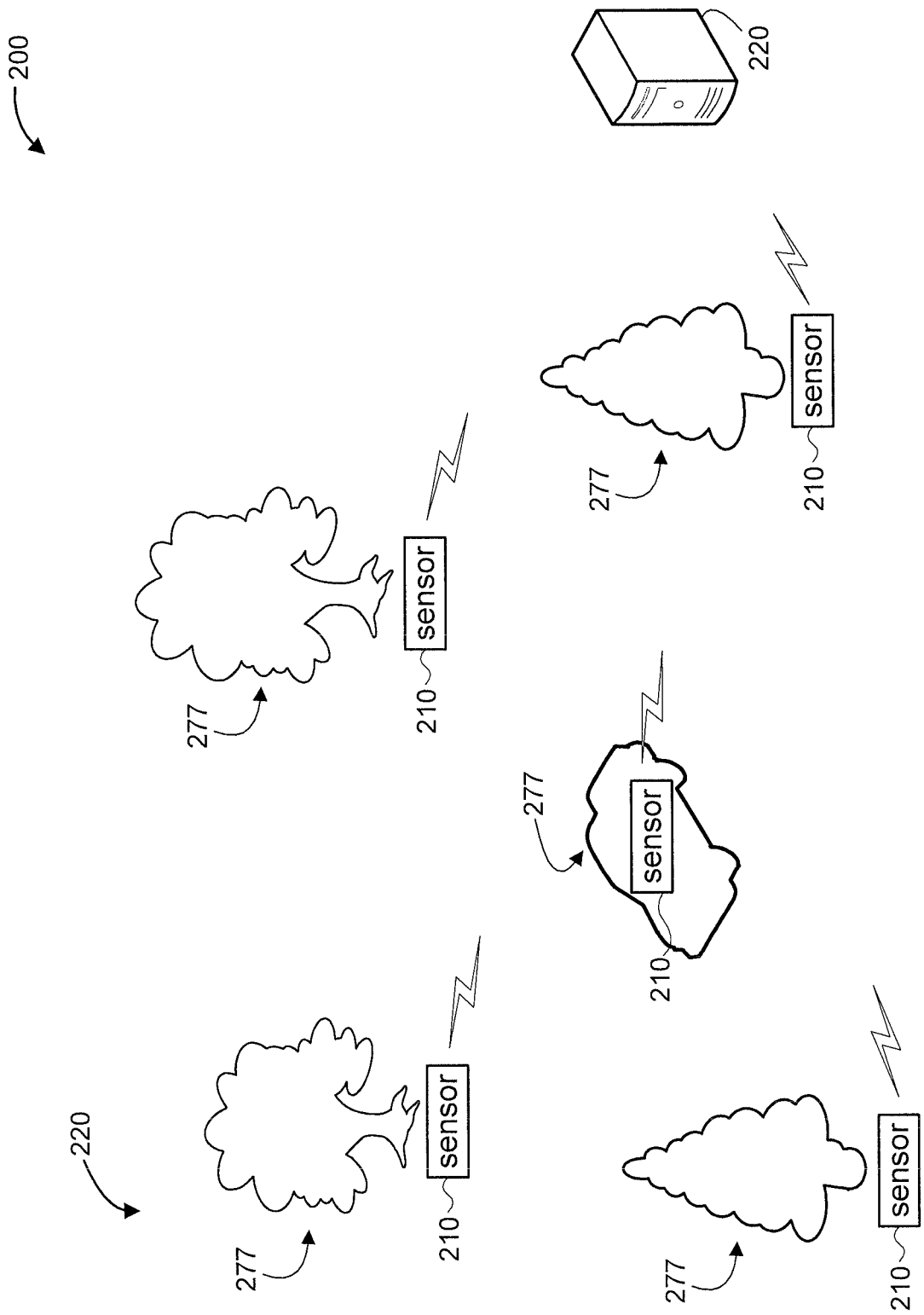
FIG. 2 shows an exemplary system for determining personalized particulate matter exposure, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
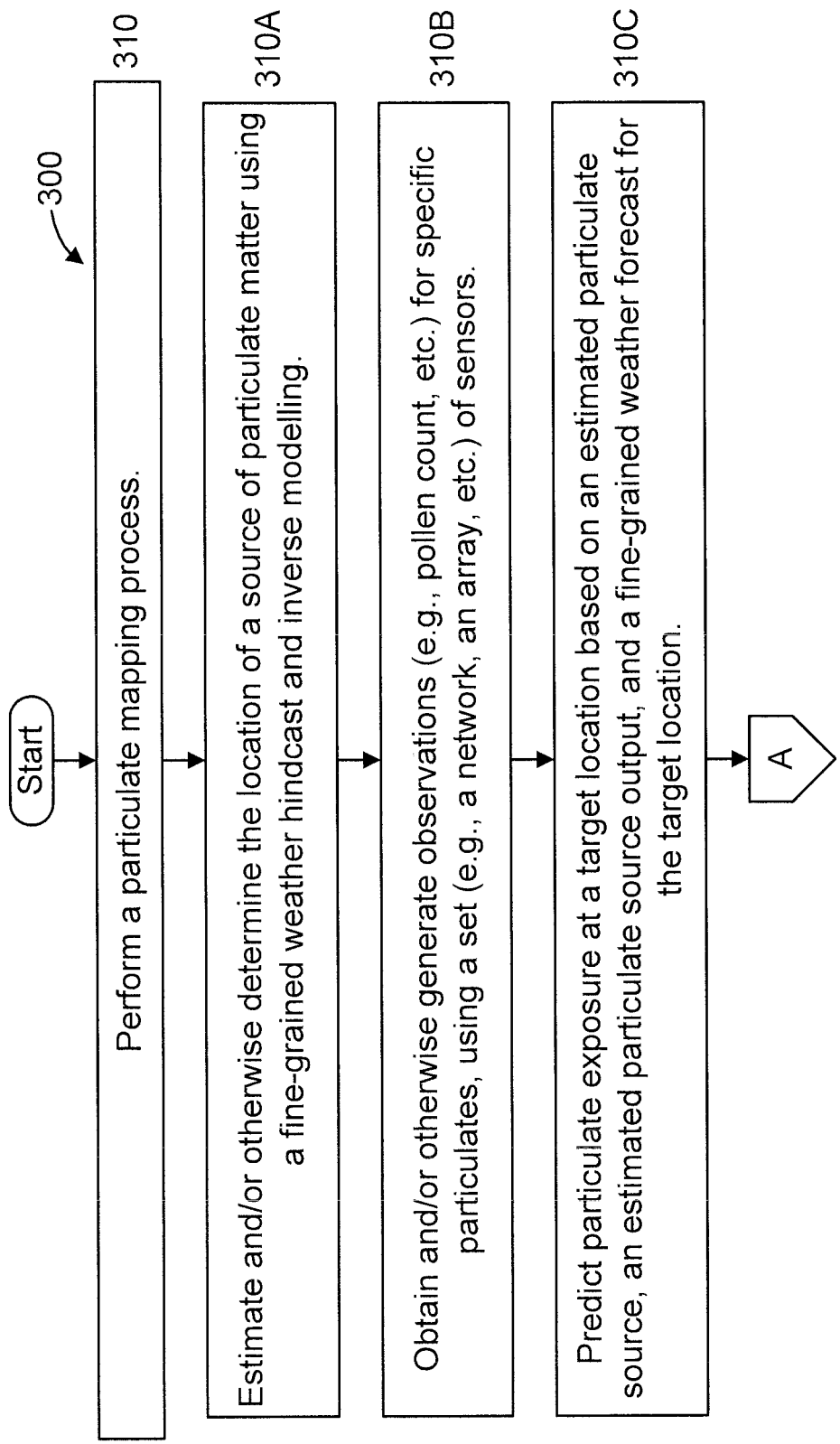
FIGS. 3-5 show an exemplary method for determining personalized particulate matter exposure, in accordance with an embodiment of the present principles.
Figure 4:
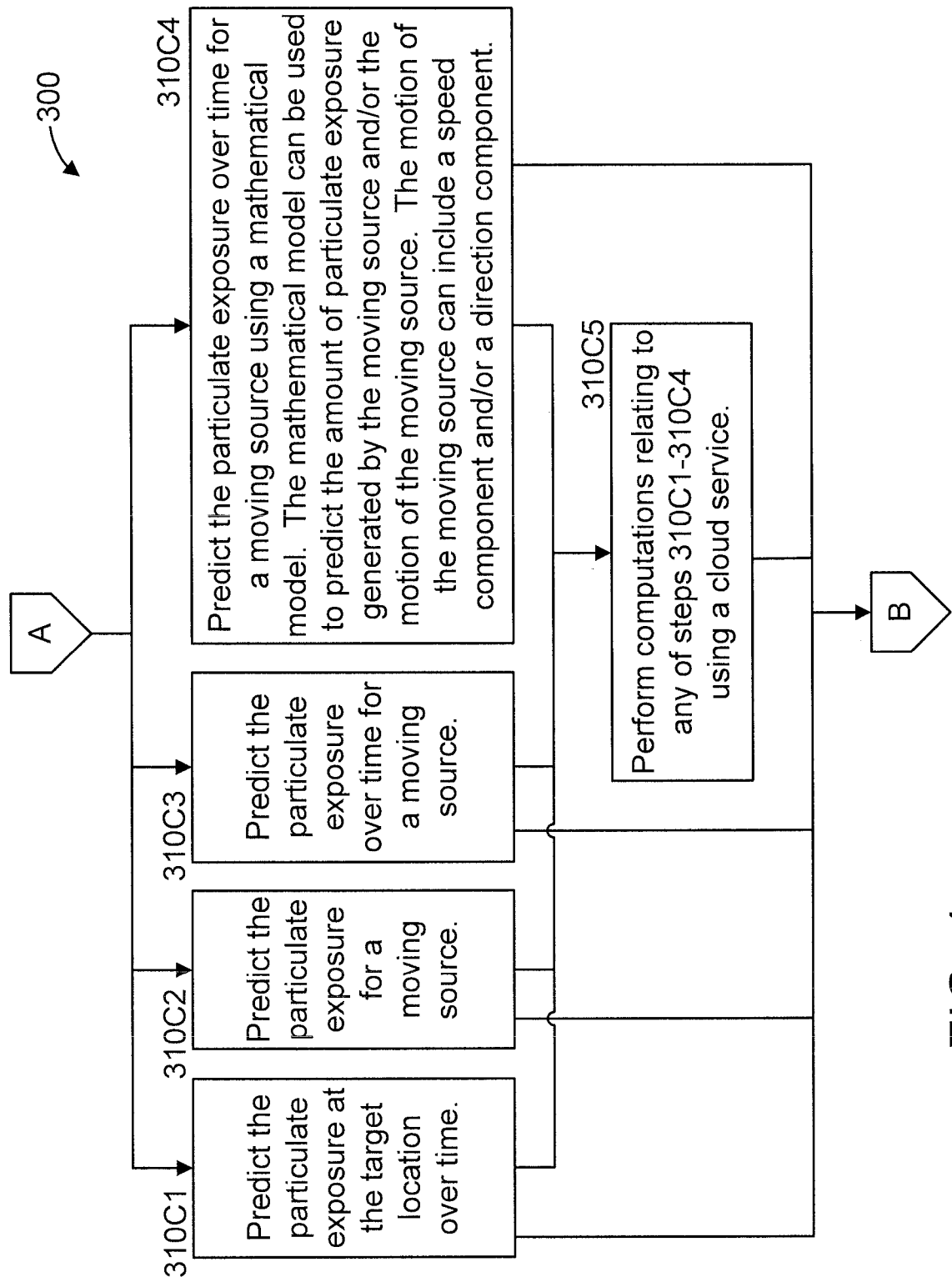
Figure 5:
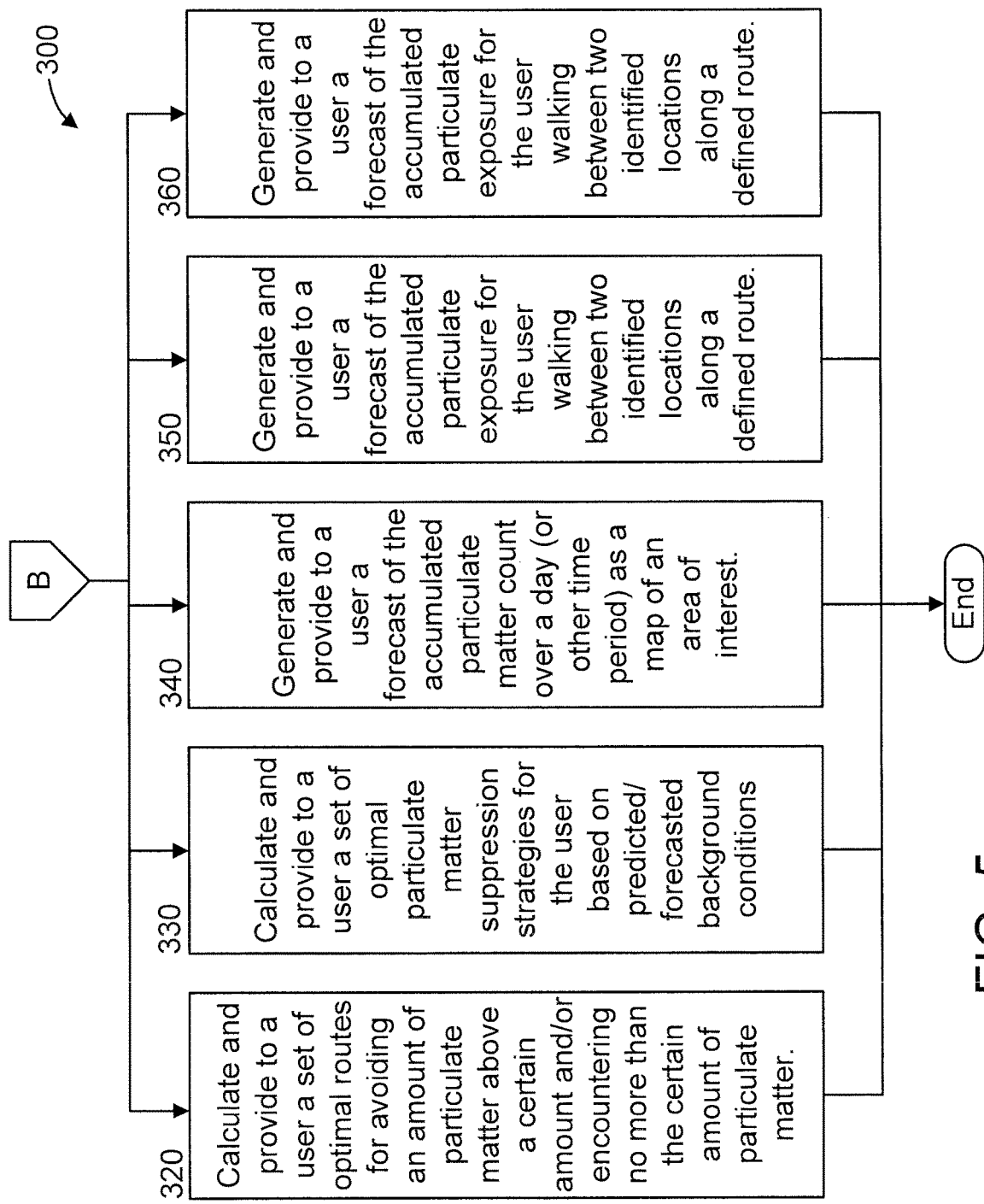

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

FIG. 2 shows an exemplary system 200 for determining personalized particulate matter exposure, in accordance with an embodiment of the present principles.

The system 200 includes a set (e.g., a network, an array, etc.) of particulate sensors (hereinafter "sensors" in short) 210 and a computer processing system 220.

Each of the sensors 210 can provide observations on one or more particulates of interest. The sensors 210 can be mobile (e.g., mounted on a car and/or other moving object) or static. The sensors 210 can provide a series of observations on particulate numbers, for specific particulates (e.g. pollen count), in space, and time.

The location of sources (e.g., trees, motor vehicles, factories, etc., noting that the embodiment of FIG. 2 shows trees and a motor vehicle for illustrative purposes) 277 of particulate matter can be determined using fine-grained weather hindcasts and inverse modelling. The sensors 210 can be placed at such locations. As used herein, hindcast can refer to forming and/or testing a predictive model using historical data.

The set of sensors 210, which may be sparse, provide measurements (observations) of particulate concentration at discrete locations and time steps. These measurements of concentration can be used to solve an inverse problem (i.e., determine from the observations the causal factors that produced the observations), to estimate the concentration over the full domain of interest or to estimate the intensity and location of the source. The estimation can be done using models of particulate matter transportation and using model reduction and robust nonlinear control methods for partial differential equations (PDEs). Mathematical models of particulate matter transportation can be deterministic or stochastic, and can include, for example, but are not limited to, the three-dimensional (3D) reaction advection diffusion equations as follows:

$$c_t + \nabla \cdot (vc) = \nabla \cdot (d\nabla c) + f$$

where c is the field representing the concentration of particles, v is the advection velocity field, d is the diffusion coefficient, f is the source term, the subscript t denotes partial differentiation with respect to time, $\nabla$ is the vector differential operator del, and · denotes an inner product.

Sources of particulate matter can also be identified by expert knowledge, results of prior studies (for example, but not limited to, arborists' maps, etc.), direct testing/observation at suspected sites, and/or so forth. For some of the preceding (e.g., expert knowledge, results of prior studies), such information can be obtained by the computer processing system 220 (e.g., over one or more communication networks). For other ones of the preceding (e.g., direct testing/observation at suspected sites), the sensors 210 can be used. In some cases, where sensors are placed at certain sites but the results indicate that these sites are not particularly problematic (particulate matter concentration is low), those sensors, or any sensors at such locations, can be excluded from system 200.

Impact models of particulate exposure can be developed using models of the chemical processes and particulate transport and sensor information relating to localized observations in space and time.

In an embodiment, based on an estimated source (or series of sources), an estimated source output (or series of source outputs), and fine-grained weather forecast, the exposure at a target location is estimated.

The forecast particulate matter count can be at a discrete point in time, or over a period of time. The sources of particulate matter can be stationary (e.g., including, but not limited to, trees, and so forth), or mobile (e.g., including, but not limited to, motor vehicles, and so forth). The number of sources, and their rate of emission, can be constant or vary over time. Thus, the forecast particulate matter count applies to a target, which can be stationary or mobile during the timeframe of the forecast.

In an embodiment, the computer processing system 220 can generate and provide a forecast of the accumulated particulate matter count over a day as a map of a city area.

In an embodiment, the computer processing system 220 can generate and provide a forecast of the accumulated exposure for a person walking between two identified locations along a defined route.

In an embodiment, the computer processing system 220 can identify and provide the accumulated exposure for an area, or people within an area having a known location, for a given mobile source with a known location. The known location can be forecasted or planned, e.g., following an incident.

In the embodiment shown in FIG. 2, the elements thereof are interconnected by a network(s) 201. The network can be a wire-based network or a wireless-based network or a hybrid of the two preceding types. In the case of a wire-based network, any wire-based communication technology and protocol can be used including, but not limited to, Universal Serial Bus (USB), coaxial cable, optical fiber, and so forth. In the case of a wireless-based network, any wireless technology and communication protocol can be used including, but not limited to, Bluetooth®, WIFI, cellular, and so forth. It is to be appreciated that the preceding described technologies and protocols are merely illustrative and, thus, other technologies and protocols can also be used in accordance with the teachings of the present principles, while maintaining the spirit of the present principles.

Moreover, one or more elements of FIG. 2 can be implemented in a cloud configuration including, for example, in a distributed configuration. Additionally, one or more elements in FIG. 2 can be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

FIGS. 3-5 show an exemplary method 300 for determining personalized particulate matter exposure, in accordance with an embodiment of the present principles.

At step 310, perform a particulate mapping process.

In an embodiment, step 310 includes steps 310A-310C.

At step 310A, estimate and/or otherwise determine the location of a source of particulate matter using a fine-grained weather hindcast and inverse modelling. Of course, other sources can be used for location estimation/determination including, but not limited to, expert knowledge, results of prior studies, direct testing/observation, and so forth.

At step 310B, obtain and/or otherwise generate observations (e.g., pollen count, etc.) for specific particulates, using a set (e.g., a network, an array, etc.) of sensors.

At step 310C, predict particulate exposure at a target location based on an estimated particulate source, an estimated particulate source output, and a fine-grained weather forecast for the target location.

In an embodiment, step 310C can include one or more of steps 310C1-310C5.

At step 310C1, predict the particulate exposure at the target location over time (e.g., a certain time period(s)).

At step 310C2, predict the particulate exposure for a moving source.

At step 310C3, predict the particulate exposure over time for a moving source.

At step 310C4, predict the particulate exposure over time for a moving source using a mathematical model. The mathematical model can be a known mathematical model. The mathematical model can be used to predict the amount of particulate exposure generated by the moving source and/or the motion of the moving source. The motion of the moving source can include a speed component and/or a direction component.

In an embodiment, one or more of steps 310C2-310C4 can involve the use of models for particulate matter transportation. Moreover, one or more of steps 310C2-310C4 can involve the use of model reduction and robust nonlinear control methods for PDEs.

Figure 6:
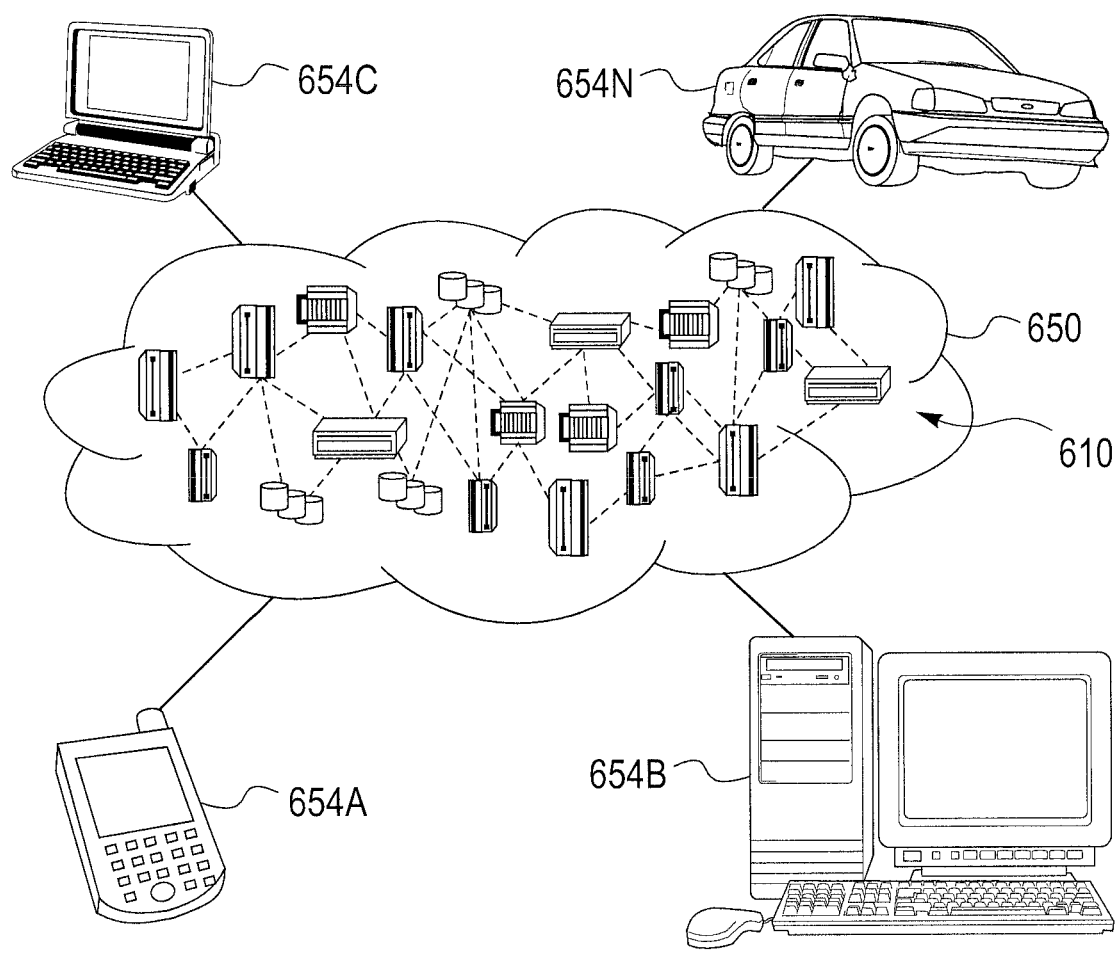
FIG. 6 shows an exemplary cloud computing environment, in accordance with an embodiment of the present principles.
Figure 7:
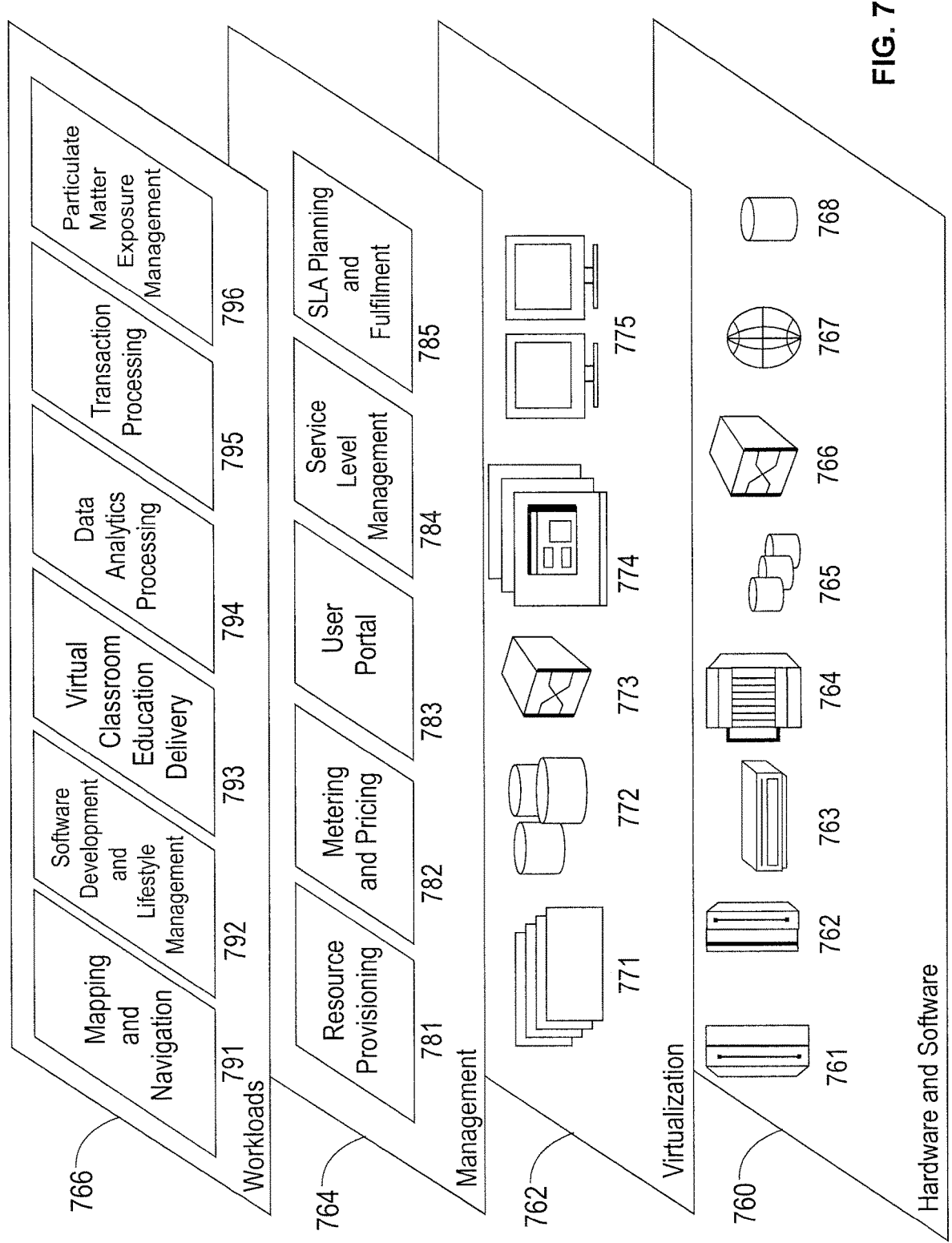
FIG. 7 shows an exemplary set of functional abstraction layers provided by the cloud computing environment shown in FIG. 6, in accordance with an embodiment of the present principles.

At step 310C5, perform computations relating to any of steps 310C1-310C4 using a cloud service (see, e.g., FIGS. 6 and 7). The cloud service can also be used to perform other steps in method 300, depending upon the implementation.

In an embodiment, method 300 includes one or more of steps 320-360. Any of steps 320-360, as well as the preceding steps, can be performed with respect to a particular user. For example, the optimal routes mentioned in step 320, the set of optimal particular matter suppression strategies mentioned in step 330, and so forth can be tailored to the particular user. In further detail, such tailoring can factor in the particular users degree of sensitivity to particulate exposure.

At step 320, calculate and provide to a user a set of optimal routes for avoiding an amount of particulate matter above a certain amount (e.g., a threshold amount) and/or encountering no more than the certain amount of particulate matter. The optimal routes can be simply specified or can be provided on an area map that includes the optimal routes.

At step 330, calculate and provide to a user a set of optimal particulate matter suppression strategies for the user based on predicted/forecasted background conditions. Such predicted/forecasted background conditions can include, but are not limited to, particulate matter due to vehicle exhaust, local industry, or bushfire activity in region. Such optimal particulate matter suppression strategies can include, but are not limited to, limiting industrial activity, treatment of pollen producing plants, for example with hormone injections.

At step 340, generate and provide to a user a forecast of the accumulated particulate matter count over a day (or other time period) as a map of an area of interest. The area of interest can be, but is not limited to, an urban area and a suburban area. The map can include locations of sensors, locations of particulate matter sources, and locations of places the user has been or intends to go to.

At step 350, generate and provide to a user a forecast of the accumulated particulate exposure for the user walking between two identified locations along a defined route.

At step 360, identify and provide the accumulated particulate exposure for an area, or people within an area having a known location, for a given mobile particulate source with a known location. The known location can be forecasted or planned, e.g., following an incident.

A description will now be given regarding various aspects relating to particular matter exposure and advantages provided by various embodiments of the present principles.

An individual's conditions and degree of reaction can be treated in a variety of ways, with some suffers using medications prophylactically when they expect to encounter triggers. An alternative approach to reduce the impact of fine particulate matters is to reduce exposure to triggers. This can be achieved by suppressing the release of fine particulates into the environment, or by avoiding areas with high concentrations of particulates.

The latter requires a fine-grained mapping of particulate levels in the environment, with the former requiring the identification of contributors to high concentration aggregations. The accumulation of particulates in a given location at a given point in time is a function of the interactions between the weather, the natural and the built environment, and is both spatially and temporally dependent.

The present principles advantageously consider and exploit the preceding in order to provide personalized particulate matter exposure management (detection, avoidance, and so forth).

Thus, embodiments of the present principles can advantageously provide a forecast capability to inform an individual of actions to reduce exposure to trigger particulates, such as routing options and selective time-dependent suppression, or accumulated impact maps across space and time for a moving target, e.g., a hay fever sufferer navigating through a city. Moreover, embodiments of the present principles can advantageously consider and exploit the impact of weather on the transportation of particulate matter.

The preceding and other advantages and benefits provided by the present principles are readily determined by one of ordinary skill in the art given the teachings of the present principles provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and personalized particulate matter exposure management 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
performing, by at least one computer processing system having a hardware processor device, a particulate mapping process of a geographic area of interest to predict particulate exposure at a target location with respect to at least one particular user based on an estimated particulate source location of a particulate source, an estimated particulate source output, and a fine-grained weather forecast for the target location, wherein said performing step includes:
estimating the estimated particulate source location using a fine-grained weather hindcast and inverse modelling to ascertain sources of particulate matter; and
estimating the estimated particulate source output based on observations of particulate exposure for one or more specific particulates obtained from a set of particulate sensors; and
obtaining, by the at least one computer processing system based on the particulate mapping process, a set of optimal routes for the at least one particular user to avoid, or encounter no more than, an amount of particulate matter above a certain amount.

2. The method of claim 1, wherein the particulate exposure is predicted over time.

3. The method of claim 1, wherein the particulate source is a mobile particulate source, and the particulate exposure is predicted based on the mobile particulate source.

4. The method of claim 3, wherein the estimated particulate source location is predicted based on the mobile particulate source over time.

5. The method of claim 4, wherein the estimated particulate source location is predicted using a mathematical model.

6. The method of claim 5, wherein the mathematical model is used to predict an amount of particulate exposure generated by the mobile particulate source.

7. The method of claim 5, wherein the mathematical model is used to predict a motion of the mobile particulate source, the motion including a speed component and a direction component.

8. The method of claim 5, wherein at least some of the computations to predict the mobile particulate source are performed using a cloud service.

9. The method of claim 1, further comprising calculating and providing, by the at least one computer processing system to the at least one particular user, the set of optimal routes.

10. The method of claim 1, further comprising providing, by the at least one computer processing system to the at least one particular user, a set of optimal particulate matter suppression strategies for the user based on predicted background conditions.

11. The method of claim 1, further comprising generating and providing, by the at least one computer processing system to the at least one particular user, a forecast of the accumulated particulate matter count over a day as a map of the geographic area of interest.

12. The method of claim 11, wherein area of interest is selected from the group consisting of: an urban area and a suburban area.

13. The method of claim 1, further comprising generating and providing, by the at least one computer processing system to the at least one particular user, a forecast of accumulated particulate exposure for the at least one particular user walking between two identified locations along a defined route.

14. The method of claim 1, further comprising identifying and providing, by the at least one computer processing system, the accumulated particulate exposure for an area, or people within an area having a known location, for a given mobile particulate source with the known location.

15. A computer program product for particulate matter exposure management, the computer program product comprising a non-transitory computer readable storage medium having program instructions embodied therewith, the program instructions executable by a computer to cause the computer to perform a method comprising:
  performing a particulate mapping process of a geographic area of interest to predict particulate exposure at a target location with respect to at least one particular user based on an estimated particulate source location of a particulate source, an estimated particulate source output, and a fine-grained weather forecast for the target location,
  wherein said performing step includes:
    estimating the estimated particulate source location using a fine-grained weather hindcast and inverse modelling to ascertain sources of particulate matter; and
    estimating the estimated particulate source output based on observations of particulate exposure for one or more specific particulates obtained from a set of particulate sensors; and
  obtaining, based on the particulate mapping process, a set of optimal routes for the at least one particular user to avoid, or encounter no more than, an amount of particulate matter above a certain amount.

16. The computer program product of claim 15, wherein the particulate source is a mobile particulate source, and the particulate exposure is predicted based on the mobile particulate source.

17. The computer program product of claim 16, wherein the estimated particulate source location is predicted based on the mobile particulate source over time.

18. The computer program product of claim 15, wherein the method further includes providing, to the at least one particular user, the set of optimal routes for performing the action.

19. A system, comprising:
  a set of particulate sensors; and
  a computer processing system having a hardware processor device, configured to:
    perform a particulate mapping process of a geographic area of interest to predict particulate exposure at a target location with respect to at least one particular user based on an estimated particulate source location of a particulate source, an estimated particulate source output, and a fine-grained weather forecast for the target location, wherein the mapping process of a geographic area of interest is performed by estimating the estimated particulate source location using a fine-grained weather hindcast and inverse modelling to ascertain sources of particulate matter, and estimating the estimated particulate source output based on observations of particulate exposure for one or more specific particulates obtained from a set of particulate sensors; and
    obtain, based on the particulate mapping process, a set of optimal routes for the at least one particular user to avoid, or encounter no more than, an amount of particulate matter above a certain amount.

20. The system of claim 19, wherein one or more elements of the system are implemented in a cloud configuration, the one or more elements including one or more of the sensors and at least a portion of the computer processing system.

* * * * *